W. TURNBULL.
CONTROLLING DEVICE FOR TRACTORS.
APPLICATION FILED APR. 27, 1917.

1,317,656.

Patented Sept. 30, 1919.
3 SHEETS—SHEET 1.

WITNESSES:
Charles Rokles
Julius E. Benisch

INVENTOR
William Turnbull
BY Strong & Townsend
ATTORNEYS

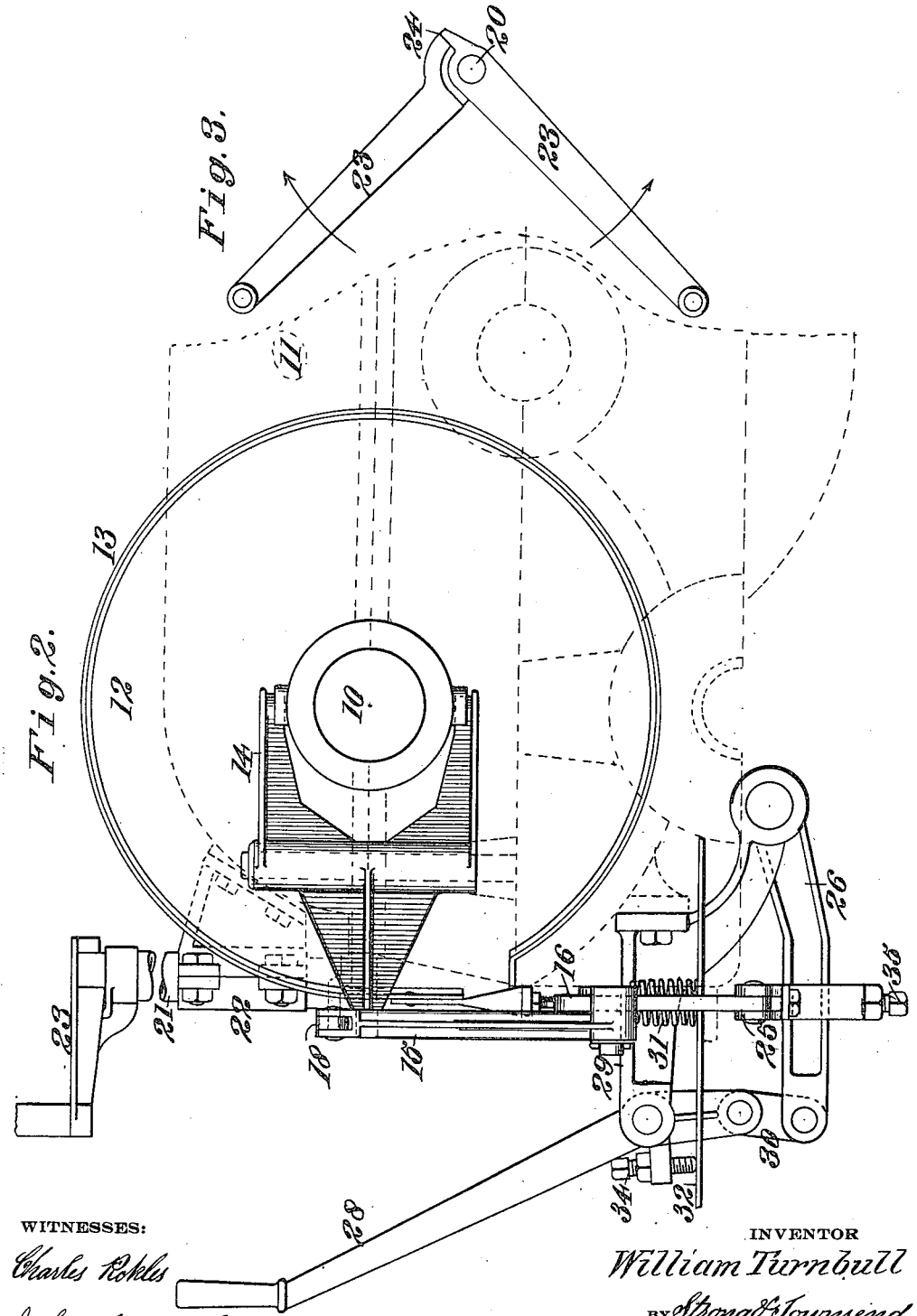

W. TURNBULL.
CONTROLLING DEVICE FOR TRACTORS.
APPLICATION FILED APR. 27, 1917.
1,317,656.
Patented Sept. 30, 1919.
3 SHEETS—SHEET 3.
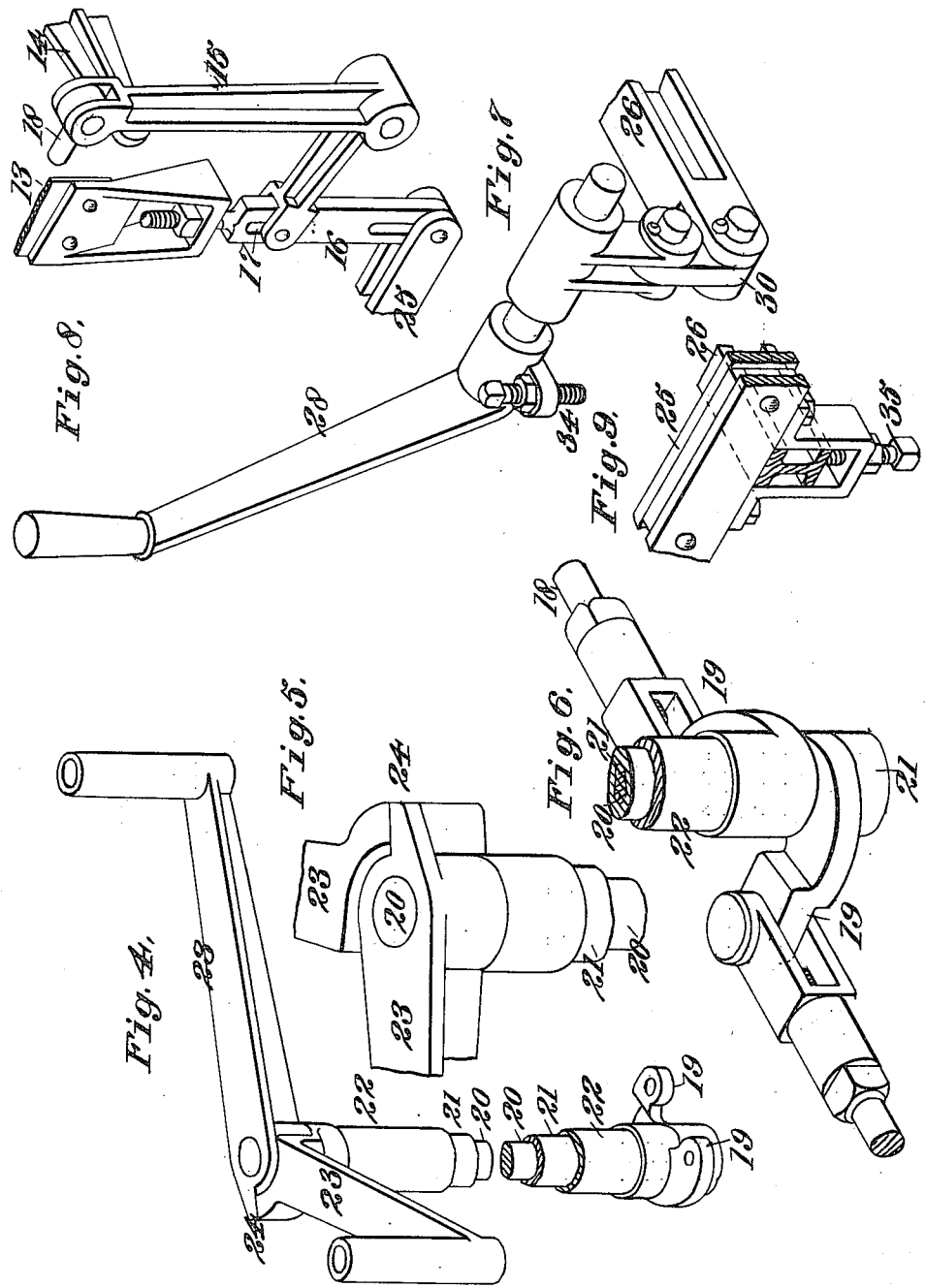
WITNESSES:
Charles Prokles
Julius C. Benesch
INVENTOR
William Turnbull
BY Strong & Townsend
ATTORNEYS

UNITED STATES PATENT OFFICE.

WILLIAM TURNBULL, OF PEORIA, ILLINOIS, ASSIGNOR TO THE HOLT MANUFACTURING COMPANY, OF STOCKTON, CALIFORNIA, A CORPORATION OF CALIFORNIA.

CONTROLLING DEVICE FOR TRACTORS.

1,317,656.   Specification of Letters Patent.   Patented Sept. 30, 1919.

Application filed April 27, 1917. Serial No. 164,946.

*To all whom it may concern:*

Be it known that I, WILLIAM TURNBULL, a citizen of the United States, residing at Peoria, in the county of Peoria and State of Illinois, have invented new and useful Improvements in Controlling Devices for Tractors, of which the following is a specification.

This invention relates to controlling devices for tractor driving and steering mechanisms.

In the self-laying track type of tractor, a clutch and brake mechanism is interposed between the drive shaft and each truck mechanism, and steering is effected by throwing out the clutch and applying the brake at one side while the mechanism at the other side remains operative.

In a co-pending application, Serial Number 142,530, filed January 15, 1917, I have shown and described a tractor wherein the steering and control are accomplished through the clutches and brakes and the actuation or control of the clutches and brakes is accomplished by the use of a unitary device so arranged that either clutch may be disengaged separately and the brake adjacent to the disengaged clutch simultaneously or subsequently set.

The present invention is in the nature of an improvement upon the mechanism of said co-pending application; and has for its object to simplify the construction and arrangement of the parts and to produce greater facility of operation in that the control device is capable of disengaging both clutches simultaneously and simultaneously setting both brakes, in addition to separately and independently controlling each set of brakes and clutches as in the prior application.

One form which my invention may assume is exemplified in the following description and illustrated in the accompanying drawings, in which—

Fig. 2 shows a side elevation of the same.

Fig. 3 shows a plan view of the unitary clutch and brake controlling device.

Fig. 4 shows a perspective view of the same.

Figs. 5 and 6 show details in perspective of said controlling device.

Fig. 7 shows a perspective view of the means for setting both brakes simultaneously.

Figs. 8 and 9 show detail views, in perspective, of certain parts of the same.

Figure 1:
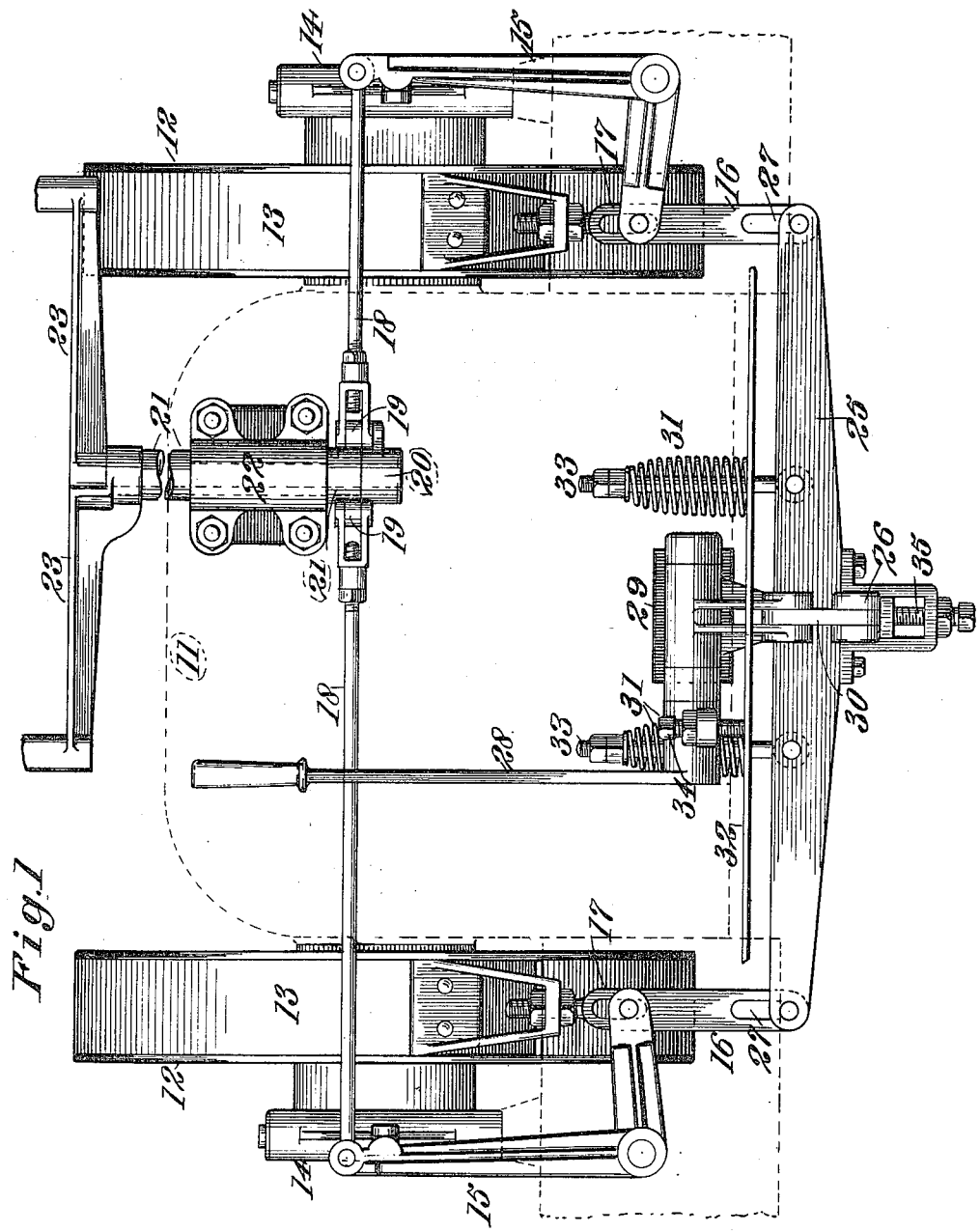
Figure 1 shows a rear elevation of a device embodying my invention applied to a tractor, the frame of which is shown in dotted lines.

In Fig. 1 a final drive is shown in rear elevation and includes the usual axles 10, one at either side of the frame 11, on each of which is a brake drum 12 carrying a band 13. Adjacent to the brake drum, and located upon the axle, is a shifting fork 14 for a clutch mechanism (not shown) which connects the driving member to the driven member. A bell-crank lever 15 is fulcrumed at its elbow to a stationary part of the frame and has its longer arm connected to the shifter fork and its short arm to the brake band, the latter connection including a strap 16 which receives the bell-crank arm in a slot 17.

From the long end of the bell-crank lever a rod 18 extends inwardly and connects with a crank arm 19 on a rocking or oscillating member. There are two such oscillating members, one a shaft 20 and the other a sleeve 21 surrounding the same and supported in a bearing 22 on the frame. Each rocking member has an operating handle 23, the two handles being normally at right angles to each other and rearwardly disposed and fitted with coöperating shoulders 24 which limit their separating movement.

Normally, the clutches are in engagement and the brakes released. A pull on the rod 18 actuates the connected bell-crank lever to first disengage the clutch and then subsequently set the brake band. This pull is applied by a movement of the handle 23 rearwardly and inwardly, and when both handles are moved toward each other the effect is to simultaneously release both clutches and then subsequently apply the brakes practically in one operation. The disengagement of one clutch and the setting of the adjacent brake band is accomplished by imparting an inward and rearward movement to but one handle, which permits the opposite handle to remain stationary, or by moving one handle outwardly and forwardly which will, on account of the shoulders 24, impart an inward and rearward movement to the other handle. The outward and forward movement of the handle imparts a thrust to its connected rod, but this will not affect the operative condition of the connected clutch and brake. Only the opposite and indirectly connected clutch and brake set will be actuated by the forward movement of the handle. This operation of the controlling handles is decidedly convenient in practice since it permits of actuation either by foot or hand. Generally when the hand is used to manipulate the handle a rearward and inward movement is preferable; whereas when the foot is used an outward and forward movement is more convenient.

In order that both brakes may be applied simultaneously, independently of the clutches, I provide a separate mechanism, comprising a cross bar 25 mounted intermediately upon a swinging support 26, pivoted to the tractor frame, said cross bar being connected at its opposite ends to the adjacent strap 16 by means of slotted connections 27. A lever 28 is fulcrumed on a bracket 29 and has a link 30 forming a toggle connection with the swinging support 26, so that the cross bar may be moved toward and from the brakes.

Springs 31, resting on a foot-board 32, press upwardly on bolts 33 to retain the cross bar in position where the brake bands will be released. A set-screw 34, on the lever 28, engages the foot-board so that the cross bar is held against upward movement independently of the lever. Also, a set-screw 35 is provided between the cross bar and supporting arm 26, whereby to adjust the position of the bar and to take up any lost motion due to wearing of the parts. The slotted connections 17 and 27 permit movement of one of the brake-setting means without disturbing the position of the other.

Various changes in the construction and arrangement of the several parts herein shown and described may be employed without departing from the spirit of my invention as disclosed in the appended claims.

Having thus described my invention, what I claim and desire to secure by Letters Patent is—

1. In a driving and steering mechanism for tractors, driving and driven members, a clutch and brake mechanism between the driving member and each driven member, a unitary controlling device for each set of brakes and clutches capable of disengaging the clutch and setting the brake in one operation, and connections between the controlling devices whereby through a different movement of one the opposite clutch and brake mechanism may be actuated.

2. In a driving and steering mechanism for tractors, driving and driven members, a clutch and brake mechanism between the driving member and each driven member, and a unitary controlling device for each set of clutches and brakes capable also of imparting operative movement to the other device without affecting its connected clutch and brake mechanism.

3. In a driving and steering mechanism for tractors, driving and driven members, a clutch and brake mechanism between the driving member and each driven member, and a unitary controlling device for each set of clutches and brakes capable also of imparting operative movement to the other device without affecting its connected clutch and brake mechanism, said controlling devices being movable relatively to simultaneously disconnect the clutches and set the brakes.

4. In a driving and steering mechanism for tractors, driving and driven members, a clutch and brake mechanism between the driving member and each driven member, a unitary controlling device for each set of brakes and clutches capable of disengaging the clutch and setting the brake in one operation, connections between the controlling devices whereby through a different movement of one the opposite clutch and brake mechanism may be actuated, and separate means for simultaneously setting both brakes independently of the clutches.

5. In a driving and steering mechanism for tractors, driving and driven members, a clutch and brake mechanism between the driving member and each driven member, a unitary controlling device for each set of brakes and clutches capable of disengaging the clutch and setting the brake in one operation, connections between the controlling devices whereby through a different movement of one the opposite clutch and brake mechanism may be actuated, and separate means for simultaneously setting both brakes independently of the clutches, said last mentioned means being movable to operative position without imparting movement to the other controlling devices.

6. In a driving and steering mechanism for tractors, driving and driven members, a clutch and brake mechanism between the driving member and each driven member, a controlling device for each set comprising an oscillating member, a unitary actuating device for each clutch and adjacent brake, connections between said oscillating member and actuating device, and coöperating connections between the oscillating members to permit relative movement in one direction and conjoint movement in the other.

7. In a driving and steering mechanism for tractors, driving and driven members, a clutch and brake mechanism between the driving member and each driven member, a pair of bell-crank levers one of which is connected to each clutch and adjacent brake for disconnecting the clutch and applying the brake in one operation, and means for simultaneously actuating said cranks to apply the brakes without affecting the clutches.

8. In a driving and steering mechanism for tractors, driving and driven members, a clutch and brake mechanism between the driving member and each driven member, a unitary device connected to each clutch and adjacent brake for disconnecting the clutch and applying the brake in one movement, and controlling connections individually movable for imparting movement to said actuating devices simultaneously or to interlock for separate movement thereof.

9. In a driving and steering mechanism for tractors, driving and driven members, a clutch and brake mechanism between the driving member and each driven member, a unitary device connected to each clutch and adjacent brake for disconnecting the clutch and applying the brake in one movement, controlling connections for said actuating devices comprising an oscillating member connected to each and a handle for each of said oscillating devices, and means for causing the handles to interlock when alternate movement of the oscillating members is desired, and permitting the handles to be moved independently when concerted movement of the oscillating members is desired.

10. In a driving and steering mechanism for tractors, driving and driven members, a clutch and brake mechanism between the driving member and each driven member, and controlling means for the same movable toward and from the operator and operable when moved in either direction to jointly release one of the clutches and apply the adjacent brake.

In testimony whereof I have hereunto set my hand in the presence of two subscribing witnesses.

WILLIAM TURNBULL.

Witnesses:
EMIL F. NORELIUS,
ROBERT W. GOTSHALL.